(12) United States Patent
Lee et al.

(10) Patent No.: US 9,614,936 B2
(45) Date of Patent: Apr. 4, 2017

(54) METHOD AND APPARATUS FOR PROCESSING MPEG MEDIA TRANSPORT PROTOCOL PACKETS

(71) Applicant: ELECTRONICS AND TELECOMMUNICATIONS RESEARCH INSTITUTE, Daejeon (KR)

(72) Inventors: Chang-Kyu Lee, Daejeon (KR); Sung-Hei Kim, Daejeon (KR); Shin-Gak Kang, Sejong (KR); Ju-Young Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 47 days.

(21) Appl. No.: 14/751,337

(22) Filed: Jun. 26, 2015

(65) Prior Publication Data
US 2016/0006784 A1 Jan. 7, 2016

(30) Foreign Application Priority Data
Jul. 4, 2014 (KR) .................. 10-2014-0083939
Jun. 8, 2015 (KR) .................. 10-2015-0080325

(51) Int. Cl.
*H04L 29/06* (2006.01)
*H04N 21/643* (2011.01)

(52) U.S. Cl.
CPC ............ *H04L 69/04* (2013.01); *H04L 65/607* (2013.01); *H04L 65/80* (2013.01); *H04N 21/643* (2013.01)

(58) Field of Classification Search
CPC ....... H04L 69/04; H04L 65/607; H04L 65/80; H04L 21/643
USPC .......................................... 370/474
See application file for complete search history.

(56) References Cited

U.S. PATENT DOCUMENTS

| | | | |
|---|---|---|---|
| 2002/0064224 A1* | 5/2002 | Hata | H04L 69/04 375/240.01 |
| 2013/0094518 A1 | 4/2013 | Bae | |
| 2013/0094563 A1 | 4/2013 | Bae | |

FOREIGN PATENT DOCUMENTS

FR WO2014170715 * 10/2014 ............ H04L 29/06

* cited by examiner

*Primary Examiner* — Ronald B Abelson
(74) *Attorney, Agent, or Firm* — Kile Park Reed & Houtteman PLLC (57) ABSTRACT

Disclosed herein are a method and apparatus for processing MMTP packets. When an MMTP packet is transmitted, the packet processing apparatus calculates a reference value from partial field values of a reference MMTP packet header, and inserts the calculated reference value into the compressed header. By the reference value, MMTP packets may be correctly distinguished and may be correctly referred to when there are two reference MMTP packets in which the lower 5 bits of packet sequence numbers are identical to each other, or even when the number of reference MMTP packets is a multiple of 256.

18 Claims, 10 Drawing Sheets

| VALUE | DATA TYPE | DEFINITION OF DATA UNIT |
|---|---|---|
| 0x0 | MPU | MEDIA-AWARE FRAGMENT OF MPU |
| 0x1 | GENERIC OBJECT | GENERIC OBJECT SUCH AS COMPLETE MPU OR OBJECT OF ANOTHER TYPE |
| 0x2 | SIGNALING MESSAGE | ONE OR MORE SIGNALING MESSAGES OR FRAGMENT OF SIGNALING MESSAGE |
| 0x3 | REPAIR SYMBOL | SINGLE COMPLETE REPAIR SYMBOL |
| 0x4 ~ 0x4 | RESERVATION FOR PRIVATE USE | RESERVATION FOR PRIVATE USE |

METHOD AND APPARATUS FOR PROCESSING MPEG MEDIA TRANSPORT PROTOCOL PACKETS

CROSS REFERENCE TO RELATED APPLICATIONS

This application claims the benefit of Korean Patent Application Nos. 10-2014-0083939 filed Jul. 4, 2014 and 10-2015-0080325 filed Jun. 8, 2015, respectively, which are hereby incorporated by reference in their entirety into this application.

BACKGROUND OF THE INVENTION

1. Technical Field

The present invention relates generally to a method and apparatus for processing protocol packets and more particularly to a method and apparatus for processing MPEG media transport protocol packets.

2. Description of the Related Art

Moving Picture Experts Group (MPEG) Media Transport (MMT) is a standard technology developed by the ISO/IEC JTC1/SC29/WG11 System sub-working group from the year 2010. According to the ISO/IEC 23008-1 standard, an MMT system is composed of four functional areas chiefly classified into a Media Processing Unit (MPU) functional area, a delivery functional area, a signaling functional area, and a presentation functional area.

In ISO/IEC 23008-1 AMD.2, a header format for compressing the header of an MPEG Media Transport Protocol (MMTP) packet and operations related to compression is defined. In accordance with the ISO/IEC 23008-1 AMD.2, before an MMTP packet in which a header is compressed is transmitted, an MMTP packet having a full header is transmitted in conformity with a preset rule. Further, to process a compressed MMTP packet, the header information of an MMTP packet, which was transmitted prior to the compressed MMTP packet, is referred to. The header of the compressed MMTP packet includes a 5-bit Reference Sequence Number (RefSeqNum) field and an 8-bit reduced Sequence Number (reduced_SeqNum) field in order to indicate which MMTP packet is to be referred to when processing the corresponding packet. The RefSeqNum field may be set to the lower 5-bit value of the packet sequence number of the reference MMTP packet required to process the compressed MMTP packet. The reduced_SeqNum field may be set to the lower 8-bit value of the packet sequence number of each compressed MMTP packet.

Existing methods for searching for a reference MMTP packet utilize a 5-bit RefSeqNum field present in the header of a compressed MMTP packet. This MMTP packet has a packet sequence number that is a 16-bit value. An MPEG media transport receiving entity receiving entity detects an MMTP packet, the lower 5-bit value of the 16-bit packet sequence number of which is identical to the value set in the lower 5-bit position of the RefSeqNum field, and processes the header of the compressed MMTP packet using the value set in the header of the detected packet.

However, since the RefSeqNum field is set to the lower 5-bit value of the packet sequence number, there may be two MMTP packets, in which the lower 5 bits of packet sequence numbers are identical to each other. When there are two MMTP packets in which the lower 5 bits of the packet sequence numbers are identical to each other, the MPEG media transport receiving entity cannot determine which one of the two MMTP packets is to be referred to. Further, since the reduced_SeqNum field of the compressed MMTP packet has 8 bits, the MPEG media transport receiving entity cannot determine which one of two MMTP packets is to be referred to when the total number of a reference MMTP packet for a currently compressed MMTP packet and reference MMTP packets for subsequently compressed MMTP packets is a multiple of 256 (i.e., when the lower 8 bits of packet sequence numbers of two consecutive reference MMTP packets other than the compressed MMTP packets are identical to each other). Consequently, in the above-described cases, the MPEG media transport receiving entity cannot process the compressed MMTP packets.

Therefore, when there are two reference MMTP packets in which the lower 5 bits of packet sequence numbers are identical to each other, or even when the number of reference MMTP packets is a multiple of 256, a new MMTP packet processing method for allowing the MMTP packets to be correctly referred to is required.

Further, in addition to the problem with reference to MMTP packets, it may be inefficient to continuously transmit headers that include repetitive information when MMTP packets are frequently transmitted. Therefore, to solve the problem of repetitive transmission of headers, a method for compressing MMTP packets and processing the compressed MMTP packets is required.

SUMMARY OF THE INVENTION

Accordingly, the present invention has been made keeping in mind the above problems occurring in the prior art, and an object of the present invention is to provide a method and apparatus that calculate a reference value from some field values of a reference MMTP packet header and insert the calculated reference value into a compressed header, thus enabling MMTP packets to be correctly distinguished and referred to when there are two reference MMTP packets in which the lower 5 bits of packet sequence numbers are identical to each other, or even when the number of reference MMTP packets is a multiple of 256.

Another object of the present invention is to provide a method and apparatus that compress MMTP packets in order to prevent inefficiency from occurring due to the repetitive transmission of headers.

A further object of the present invention is to provide a method and apparatus that process the compressed MMTP packets.

In accordance with an aspect of the present invention to accomplish the above objects, there is provided a method for processing MPEG Media Transport Protocol (MMTP) packets, the method being performed by an MPEG media transport sending entity, the method including calculating a reference value using partial field values of a reference MMTP packet header so as to refer to a reference MMTP packet; generating a reduced size header including the reference value as a field; and generating a compressed MMTP packet including the reduced size header.

The partial field values may include a timestamp field value and a packet sequence number field value of the reference MMTP packet header.

Each of the timestamp field value and the packet sequence number field value may be a 32-bit value.

Calculating the reference value may include calculating the reference value by applying a checksum algorithm to the partial field values of the reference MMTP packet header.

Calculating the reference value may include, if a number of bits of a resultant value generated by applying the checksum algorithm exceeds a preset number of bits, using a number of bits of the resultant value identical to the preset number of bits as the reference value.

The preset number of bits may be the number of bits of a field for which the reference value is to be set.

Calculating the reference value may include, if the number of bits of the resultant value exceeds the preset number of bits, using a number of least significant bits of the resultant value identical to the preset number of bits as the reference value.

The checksum algorithm may be a Berkeley Software Distribution (BSD) checksum-8 algorithm.

Generating the reduced size header may include additionally including a predetermined difference as a field in the reduced size header, wherein the predetermined difference is a difference between a timestamp field value of the reference MMTP packet header and a possible value to be present in a current packet timestamp field if a full-size header is used.

Generating the reduced size header may include additionally including part of possible bits of a packet sequence number field to be present in the header if a full-size header is used, as a field in the reduced size header.

The reference MMTP packet header may be allocated a compression flag field and an indicator flag field.

The compression flag field may be a field indicating which one of a full-size header and a compressed header has been used in the reference MMTP packet.

The indicator flag field may be a field indicating whether the full-size header of the reference MMTP packet is to be used as a reference of the compressed header.

The reference MMTP packet header may include 4 bits corresponding to a reduced type field and 2 bits to which the compression flag field and the indicator flag field are respectively allocated.

In accordance with another aspect of the present invention to accomplish the above objects, there is provided a method for processing MMTP packets, the method being performed by an MPEG media transport receiving entity, the method including determining, using a received MMTP packet header, whether a compressed header has been used in an MMTP packet; if it is determined that the compressed header has been used in the MMTP packet, verifying, using a reference value included in the MMTP packet header, whether a most recently received reference MMTP packet is to be used to decompress the MMTP packet header; and if it is verified that the reference MMTP packet is to be used to decompress the MMTP packet header, designating reference information of the reference MMTP packet to be referred to when the MMTP packet is processed.

Verifying whether the reference MMTP packet is to be used to decompress the MMTP packet header may include determining whether a value calculated by applying a checksum algorithm to a timestamp field value and a packet sequence number field value of the reference MMTP packet header is identical to the reference value included in the MMTP packet header; and if it is determined that the calculated value is identical to the reference value, verifying that the reference MMTP packet is to be used to decompress the MMTP packet header.

The MMTP packet header may be allocated a compression flag field and an indicator flag field.

The compression flag field may be a field indicating which one of a full-size header and a compressed header has been used in the MMTP packet.

The indicator flag field may be a field indicating whether the full-size header of the MMTP packet is to be used as a reference of the compressed header.

The method may further include, if the MMTP packet header has not been compressed, determining whether the MMTP packet is a reference MMTP packet; if it is determined that the MMTP packet is the reference MMTP packet, storing reference information included in the MMTP packet header; and if it is determined that the MMTP packet is not a reference MMTP packet, processing the MMTP packet as a normal MMTP packet.

In accordance with a further aspect of the present invention to accomplish the above objects, there is provided a packet processing apparatus, including memory for storing at least one program; and a processor for executing the at least one program, wherein the at least one program is configured to calculate a reference value using partial field values of a reference MMTP packet header to refer to a reference MMTP packet, generate a reduced size header including the reference value as a field, and generate a compressed MMTP packet including the reduced size header.

The at least one program may be further configured to determine, using a received MMTP packet header, whether a compressed header has been used in an MMTP packet, if it is determined that the compressed header has been used in the MMTP packet, verify, using a reference value included in the MMTP packet header, whether a most recently received reference MMTP packet is to be used to decompress the MMTP packet header, and if it is verified that the reference MMTP packet is to be used to decompress the MMTP packet header, designate reference information of the reference MMTP packet to be referred to when the MMTP packet is processed.

The partial field values may include a timestamp field value and a packet sequence number field value of the reference MMTP packet header.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions, as well as descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, an MMTP packet, the header of which is compressed, is referred to as a "compressed MMTP packet". Further, an MMTP packet having a full header, which is to be referred to in order to process the header of the compressed MMTP packet, is referred to as a "reference MMTP packet". Furthermore, among pieces of information required in order to process the header of the reference MMTP packet or the compressed MMTP packet from the header, separately stored information is referred to as "reference information".

A full header and a compressed header handled in the embodiments may not be based on the MMTP packet header defined in ISO/IEC 23008-1 AMD.1, but may denote an MMTP packet header newly defined in ISO/IEC 23008-1 AMD.2.

In the existing full header, there is no space to which a B flag and an I flag can be added. Therefore, in the following embodiments, a scheme for reducing the number of bits allocated to the payload data type field of a full header from 6 to 4 is proposed. By the 4-bit payload data type field, a total of 16 types may be classified.

In the following embodiments, a scheme for eliminating five types of fields to reduce the size of the compressed header is proposed. For example, a C flag and a type field may be excluded through the use of a Korean National Body (KRNB) comment. A Forward Error Correction (FEC) field may be excluded in consideration of the fact that a compressed MMTP packet uses the same FEC scheme as that used in a reference MMTP packet. An R flag may be excluded in consideration of the fact that it is a Route Access Protocol (RAP) flag and the compressed MMTP packet cannot include a RAP. A 'reduced_pckt_id' field may be excluded in consideration of the fact that the compressed MMTP packet delivers the same asset as that delivered by the reference MMTP packet.

In the following embodiments, a scheme for adding a version field to the beginning of a compressed header is proposed.

A receiver acquires packets only from a given asset. Further, a packet counter increases the count value for all delivered assets. Therefore, the 'reduced_PckCnt' field cannot be used to correctly restore the packet counter.

A 'RefSeqNum' field needs to be improved so as to perform a more robust validity check between the compressed packet and the reference packet for the compressed packet.

Hereinafter, preferred embodiments for solving the above-described issues will be described in detail with reference to the attached drawings.

Below, the terms "compressed" and "reduced size" may be used as having the same meaning, and may be exchanged with each other.

Figure 1:
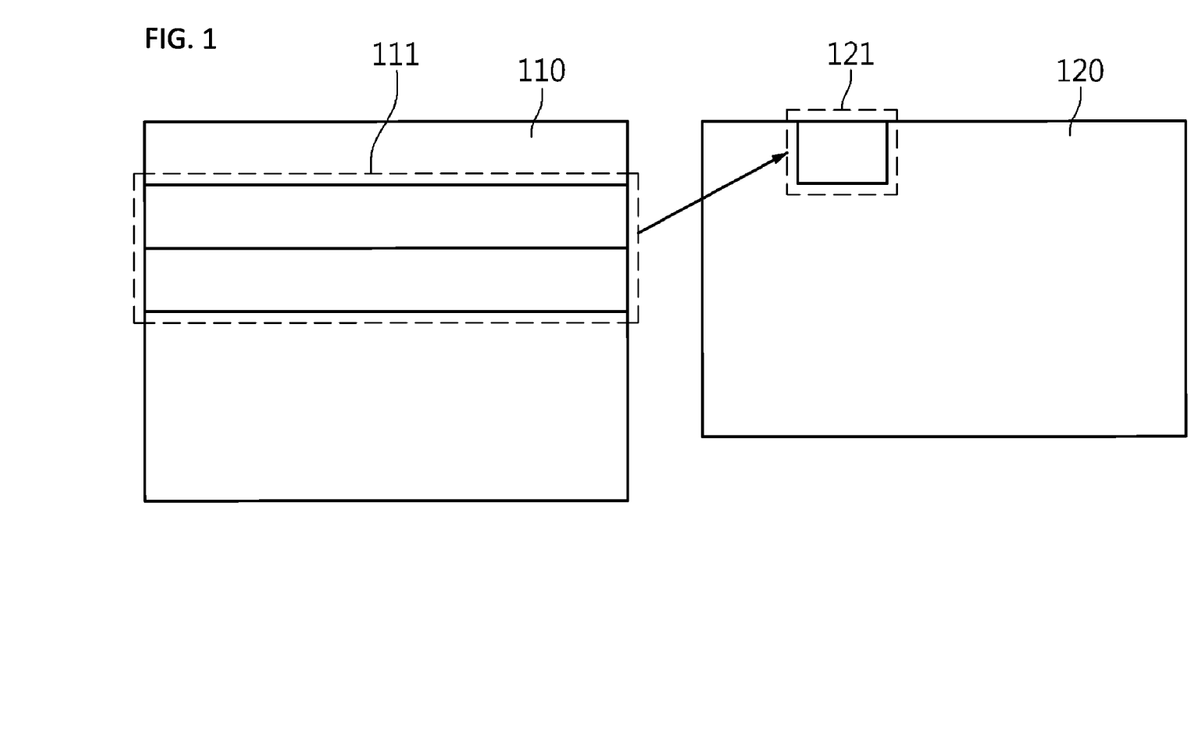
FIG. 1 is a diagram showing a method for processing MPEG Media Transport Protocol (MMTP) packets according to an embodiment of the present invention.

FIG. 1 is a diagram showing a method for processing MMTP packets according to an embodiment of the present invention.

Referring to FIG. 1, in the MMTP packet processing method according to the embodiment of the present invention, an MPEG Media Transport (MMT) sending entity may compress an MMTP packet using a method of inserting a reference value field 121, which is the result calculated using a reference field 111 in a reference MMTP packet header 110, into a compressed MMTP packet header 120.

The MPEG media transport sending entity may calculate a reference value using some field values of the reference MMTP packet header to refer to the reference MMTP packet, generate a reduced size header including the reference value as a field, and generate a compressed MMTP packet including the reduced size header.

In this case, some field values may include the timestamp field value and the packet sequence number field value of the reference MMTP packet header. Here, both the timestamp field value and the packet sequence number field value may be 64-bit values. The MPEG media transport sending entity may calculate the reference value using the timestamp field value and the packet sequence number field value of the reference MMTP packet header. The calculated reference value may be used as a reference.

Each of the timestamp field value and the packet sequence number field value may be a 32-bit value.

The MPEG media transport sending entity may calculate the reference value by applying a checksum algorithm to some field values of the reference MMTP packet header.

For example, the checksum algorithm may be a BSD checksum-8 algorithm.

Here, when the number of bits of the resultant value generated by applying the checksum algorithm exceeds the preset number of bits, the MPEG media transport sending entity uses only a number of bits of the resultant value identical to the preset number of bits as the reference value.

The preset number of bits may be the number of bits of the field for which the reference value is to be set. In other words, since the number of bits of the field for which the reference value is to be set is limited, the number of bits of the resultant value identical to the preset number of bits may be selected as the reference value.

In this case, when the number of bits of the resultant value generated by applying the checksum algorithm exceeds the preset number of bits, the MPEG media transport sending entity may use only the number of least significant bits (LSBs) of the resultant value identical to the preset number of bits as the reference value. For example, when the number of bits of the resultant value is 8, and the field for which the reference value is to be set is a reference checksum field, and when the number of bits of the reference checksum field is 6, the lower 6 bits of the resultant value may be set as the value of the reference checksum field.

An MPEG media transport receiving entity may verify, using the reference checksum field, whether the last received reference MMTP packet is to be used to decompress the current MMTP packet header.

Here, the MPEG media transport sending entity may further include a delta timestamp field in the reduced size header. The delta timestamp field may include the difference between the timestamp field value of the reference MMTP packet header and the value that might have been present in the current packet timestamp field if a full-size header had been used. In other words, the reduced size header may include a delta timestamp field that indicates the difference between the timestamp field value of the reference MMTP packet header and the value that might have been present in the current packet timestamp field if the full-size header had been used. The delta timestamp field may have 19 bits.

The difference may be coded in a way similar to the 19 least significant bits of a Network Time Protocol (NTP) timestamp. If the difference between the timestamp field value of the reference MMTP packet header and the value that might have been present in the current packet timestamp field if the full-size header had been used is greater than the maximum value that can be coded using the number of bits in the delta timestamp field, a packet having a full-size header may be transmitted in order to provide a new timestamp reference value for a further packet having the reduced size header.

Here, the MPEG media transport sending entity may additionally include a reduced sequence number field in the reduced size header. The reduced sequence number field may include some of the bits of the packet sequence number field that might have been in the header if the full-size header had been used. In other words, the reduced size header may include the reduced sequence number field, which indicates some of the bits of the packet sequence number field that might have been present in the header if the full-size header had been used.

The reduced sequence number field may have a preset number of bits among the bits of the packet sequence number field. The reduced sequence number field may have a number of LSBs of the packet sequence number field identical to the preset number of bits. For example, the reduced sequence number field may have 8 LSBs of the bits of the packet sequence number field.

Since the reduced sequence number field is coded in a bit number corresponding to the preset number of bits, the MPEG media transport receiving entity may take into consideration the number of times the reduced number field is wrapped around 0 in order to calculate the original packet sequence number.

In this regard, a compression flag field and an indicator flag field may be allocated to the reference MMTP packet header. That is, the reference MMTP packet header may include the compression flag field and the indicator flag field.

The compression flag field may be a field indicating which one of a full-size header and a compressed header has been used in the reference MMTP packet. The compression flag field may be added to the beginning of the header. The compression flag field may indicate whether the header has been compressed. When the compression flag field is set to 0, a full-size header may be used. Alternatively, when the compression flag field is set to 1, a reduced size header may be used. The reduced size header may denote a compressed header.

The indicator flag field may be a field indicating whether the full-size header of the reference MMTP packet is to be used as the reference for a compressed header. In other words, the indicator flag field may indicate whether a current full-size header is to be subsequently used as a reference by the MPEG media transport receiving entity. When the full-size header is used as the reference, the indicator flag field may be set to 1. The indicator flag field allows a recipient to be aware that, as the information of the current full-size header is subsequently used as the reference of the packet having a compressed header, the information of the current full-size header must be stored.

Here, the existing 6-bit type field of the reference MMTP packet header may be reduced to a 4-bit field, and the compression flag field and the indicator flag field may be allocated to the 2 bits remaining as a result of the reduction. Therefore, the reference MMTP packet header may include 4 bits for the reduced type field and 2 bits to which the compression flag field and the indicator flag field are allocated, respectively.

Figure 2:
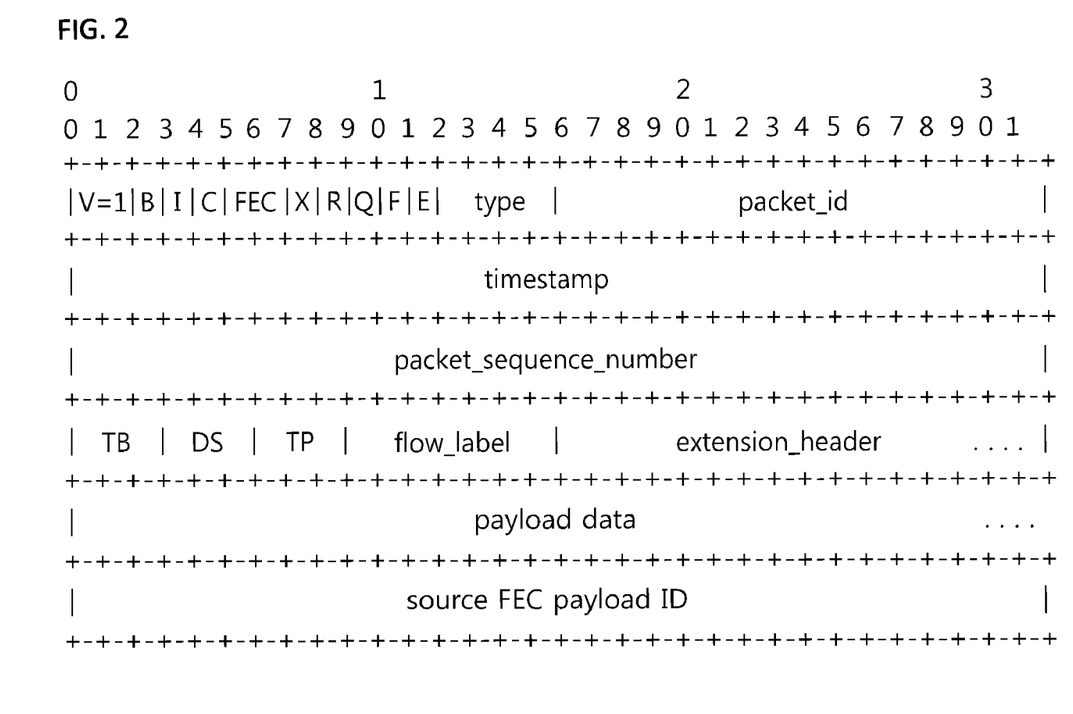
FIG. 2 is a diagram showing the full-size header of an MMTP packet according to an embodiment of the present invention.

FIG. 2 is a diagram showing the full-size header of an MMTP packet according to an embodiment of the present invention.

Referring to FIG. 2, the full-size header of an MMTP packet according to the embodiment may be a header in which the number of bits allocated to the payload data type field of a full header is reduced from 6 bits to 4 bits, compared to a conventional MMTP packet full-size header. Further, the full-size header of the MMTP packet according to the embodiment may be a header in which a B flag and an I flag are respectively allocated to 2 bits, acquired by this reduction, compared to the conventional MMTP packet full-size header.

Data types may be classified into a total of 16 types by the 4-bit payload data type field.

Figure 3:
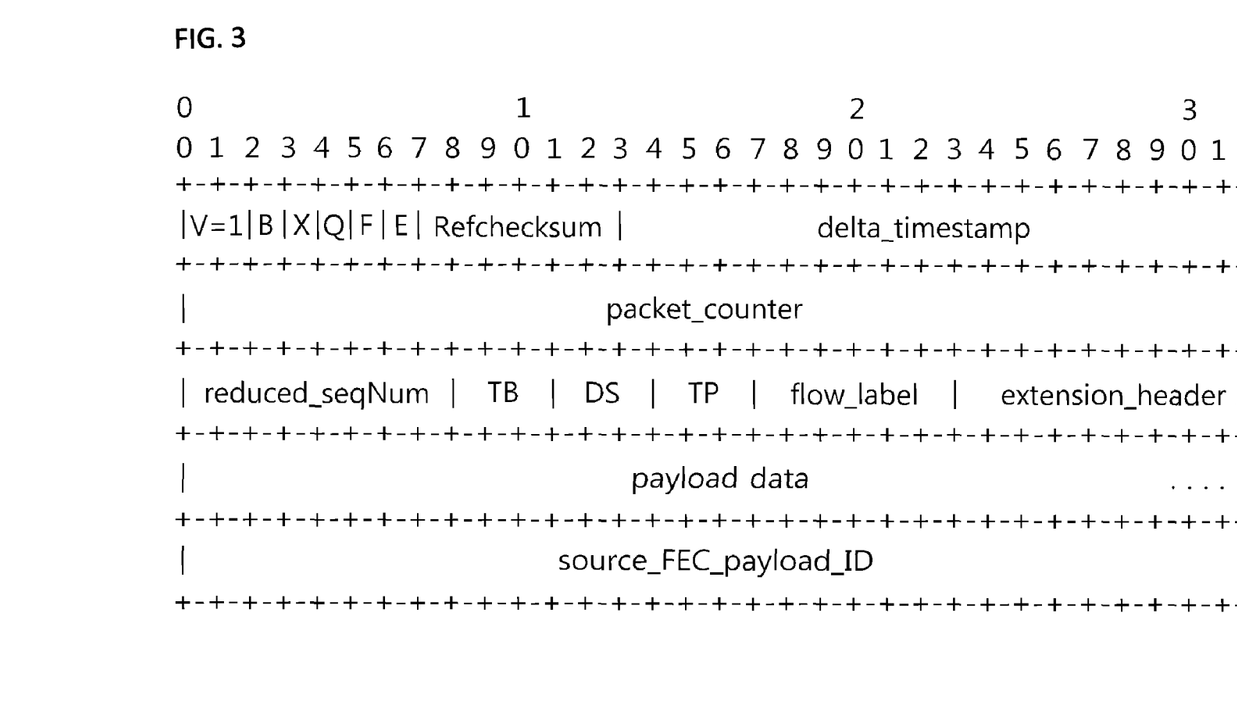
FIG. 3 is a diagram showing the compressed header of an MMTP packet according to an embodiment of the present invention.

FIG. 3 is a diagram showing the compressed header of an MMTP packet according to an embodiment of the present invention.

Referring to FIG. 3, a 1-bit B flag and a 6-bit 'Refchecksum' field may be allocated to the compressed header of an MMTP packet according to an embodiment of the present invention, unlike the compressed header of a conventional MMTP packet.

A C flag and a type field may be excluded through the use of a KRNB comment. For example, the C flag and the type field may be replaced with the use of the KRNB comment.

An FEC field may be excluded in consideration of the fact that a compressed MMTP packet uses the same FEC scheme as that used in the reference MMTP packet. For example, the FEC field may be replaced with the FEC scheme used in the reference MMTP packet.

An R flag, which is an RAP flag, may be excluded in consideration of the fact that the compressed MMTP packet cannot include an RAP.

The 'reduced_pckt_id' field may be excluded in consideration of the fact that the compressed MMTP packet delivers the same asset as that delivered by the reference MMTP packet. For example, the 'reduced_pckt_id' field may be replaced with the asset delivered by the reference MMTP packet.

A version field indicating the version may be added to the beginning of the compressed header.

Figure 4:
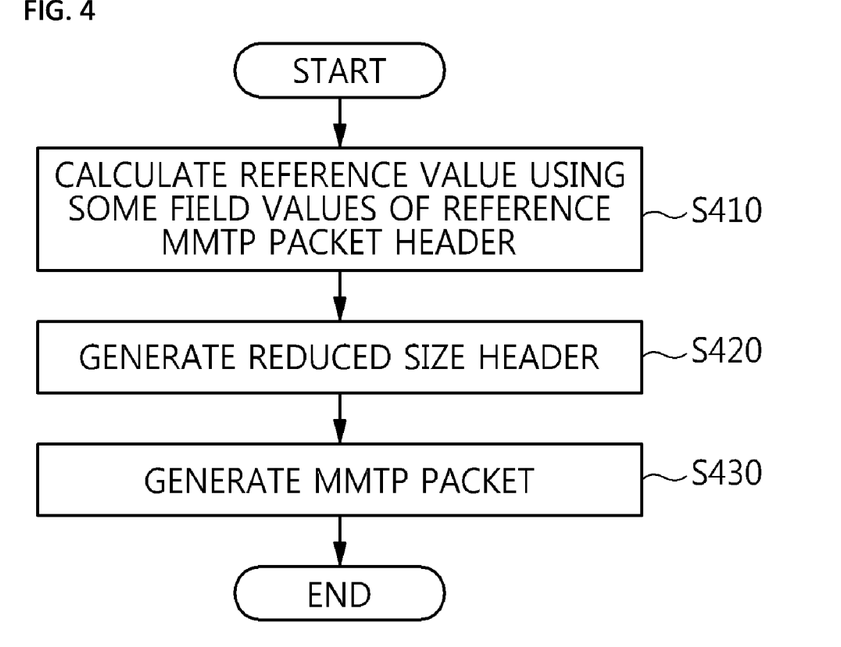
FIG. 4 is an operation flowchart schematically showing a method for processing MMTP packets according to an embodiment of the present invention.

FIG. 4 is an operation flowchart showing a method for processing MMTP packets according to an embodiment of the present invention.

Referring to FIG. 4, in the MMTP packet processing method according to the embodiment, an MPEG media transport sending entity may calculate a reference value using some field values of a reference MMTP packet header in order to refer to the reference MMTP packet at step S10.

Here, the MPEG media transport sending entity may calculate the reference value using the timestamp field value and the packet sequence number field value of the reference MMTP packet header.

Each of the timestamp field value and the packet sequence number field value may be a 32-bit value.

Here, the MPEG media transport sending entity may calculate the reference value by applying a checksum algorithm to some field values of the reference MMTP packet header.

For example, the checksum algorithm may be a BSD checksum-8 algorithm.

Here, if the number of bits of the resultant value generated by applying the checksum algorithm exceeds the preset number of bits, the MPEG media transport sending entity may use only the number of bits of the resultant value identical to the preset number of bits as the reference value.

The preset number of bits may be the number of bits of the field for which the reference value is to be set. That is, since the number of bits of the field for which the reference value is to be set is limited, only the number of bits of the resultant value identical to the preset number of bits may be selected as the reference value.

When the number of bits of the resultant value generated by applying the checksum algorithm exceeds the preset number of bits, the MPEG media transport sending entity may use, as the reference value, only the number of LSBs of the resultant value identical to the preset number of bits. Further, in the MMTP packet processing method according to the embodiment, the MPEG media transport sending entity may generate a reduced size header including the reference value as a field at step S420.

For example, when the number of bits of the resultant value is 8, the field for which the reference value is to be set is a reference checksum field, and the number of bits of the reference checksum field is 6, the 6 low-order bits of the resultant value may be set as the value of the reference checksum field.

The MPEG media transport receiving entity may verify, using the reference checksum field, whether the last received reference MMTP packet is to be used to decompress the current MMTP packet header.

In this case, the MPEG media transport sending entity may further include a delta timestamp field in the reduced size header. The delta timestamp field may include the difference between the timestamp field value of the reference MMTP packet header and the value that might have been present in the current packet timestamp field if the full-size header had been used. In other words, the reduced size header may include a delta timestamp field indicating the difference between the timestamp field value of the reference MMTP packet header and the timestamp field value and the value that might have been present in the current packet timestamp field if the full-size header had been used. The delta timestamp field may have a 19-bit value.

The difference may be coded in a way similar to the 19 least significant bits of a Network Time Protocol (NTP) timestamp. If the difference between the timestamp field value of the reference MMTP packet header and the value that might have been present in the current packet timestamp field if the full-size header had been used is greater than the maximum value that can be coded using the number of bits in the delta timestamp field, a packet having a full-size header may be transmitted in order to provide a new timestamp reference value for a further packet having the reduced size header.

Here, the MPEG media transport sending entity may additionally include a reduced sequence number field in the reduced size header. The reduced sequence number field may include some of the bits of the packet sequence number field that might have been in the header if the full-size header had been used. In other words, the reduced size header may include the reduced sequence number field, which indicates some of the bits of the packet sequence number field that might have been present in the header if the full-size header had been used.

The reduced sequence number field may have a preset number of bits among the bits of the packet sequence number field. The reduced sequence number field may have a number of LSBs of the packet sequence number field identical to the preset number of bits. For example, the reduced sequence number field may have 8 LSBs of the bits of the packet sequence number field.

Since the reduced sequence number field is coded in a bit number corresponding to the preset number of bits, the MPEG media transport receiving entity may take into consideration the number of times the reduced number field is wrapped around 0 in order to calculate the original packet sequence number.

A compression flag field and an indicator flag field may be allocated to the reference MMTP packet header. That is, the reference MMTP packet header may include the compression flag field and the indicator flag field. The compression flag field may have a 1-bit value, and the indicator flag field may have a 1-bit value.

The compression flag field may be a field indicating which one of a full-size header and a compressed header has been used in the reference MMTP packet. The compression flag field may be added to the beginning of the header. The compression flag field may indicate whether the header has been compressed. When the compression flag field is set to 0, a full-size header may be used. Alternatively, when the compression flag field is set to 1, a reduced size header may be used. The reduced size header may denote a compressed header.

The indicator flag field may be a field indicating whether the full-size header of the reference MMTP packet is to be used as the reference for a compressed header. In other words, the indicator flag field may indicate whether a current full-size header is to be subsequently used as a reference by the MPEG media transport receiving entity. When the full-size header is used as the reference, the indicator flag field may be set to 1. The indicator flag field allows a recipient to be aware that, as the information of the current full-size header is subsequently used as the reference of the packet having a compressed header, the information of the current full-size header must be stored.

Here, the existing 6-bit type field of the reference MMTP packet header may be reduced to a 4-bit field, and the compression flag field and the indicator flag field may be allocated to the 2 bits remaining as a result of the reduction. Therefore, the reference MMTP packet header may include 4 bits for the reduced type field and 2 bits to which the compression flag field and the indicator flag field are allocated, respectively.

Also, in the MMTP packet processing method according to the embodiment, the MPEG media transport sending entity may generate a compressed MMTP packet that includes the reduced size header at step S430.

Figure 5:
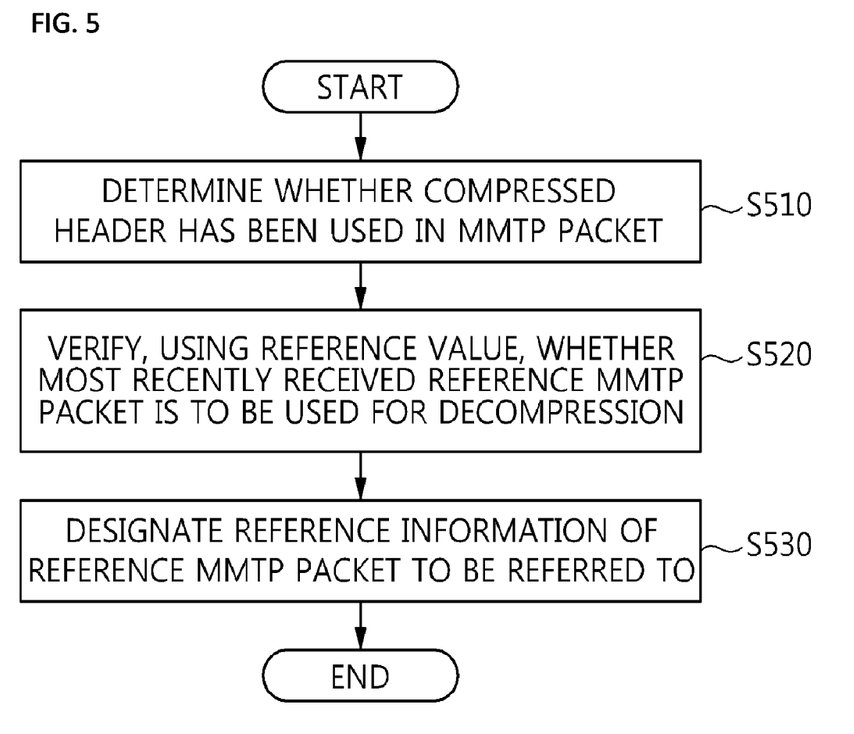
FIG. 5 is an operation flowchart showing a method for processing MMTP packets according to an embodiment of the present invention.

FIG. 5 is an operation flowchart showing a method for processing MMTP packets according to an embodiment of the present invention.

Referring to FIG. 5, in the MMTP packet processing method according to the embodiment, the MPEG media transport (MMT) receiving entity may determine, using a received MMTP packet header, whether a compressed header has been used in the MMTP packet at step S510.

Here, a compression flag field and an indicator flag field may be allocated to the MMTP packet header.

The compression flag field may be a field indicating which one of a full-size header and a compressed header has been used in the MMTP packet. The compression flag field may be added to the beginning of the header. The compression flag field may indicate whether the header has been compressed. When the compression flag field is set to 0, a full-size header may be used. Alternatively, when the compression flag field is set to 1, a reduced size header may be used. The reduced size header may denote a compressed header.

The indicator flag field may be a field indicating whether the full-size header of the MMTP packet is to be used as the reference for a compressed header. In other words, the indicator flag field may indicate whether a current full-size header is to be subsequently used as a reference by the MPEG media transport receiving entity. When the full-size header is used as the reference, the indicator flag field may be set to 1. The indicator flag field allows a recipient to be aware that, as the information of the current full-size header is subsequently used as the reference of the packet having a compressed header, the information of the current full-size header must be stored.

Further, in the MMTP packet processing method according to the embodiment, if it is determined that the compressed header has been used in the MMTP packet, the MPEG media transport receiving entity may verify, using the reference value included in the MMTP packet header, whether the most recently received reference MMTP packet is to be used to decompress the header of the MMTP packet at step S520.

Here, in the MMTP packet processing method according to the embodiment, the MPEG media transport receiving entity may determine whether the value, calculated by applying a checksum algorithm to the timestamp field value and the packet sequence number field value of the reference MMTP packet header, is identical to the reference value included in the MMTP packet header, and may verify that the reference MMTP packet is to be used to decompress the MMTP packet header if it is determined that the calculated value is identical to the reference value at step S520.

Furthermore, in the MMTP packet processing method according to the embodiment, if the reference MMTP packet is to be used to decompress the MMTP packet header, the MPEG media transport receiving entity may designate the reference information of the reference MMTP packet to be referred to upon processing the MMTP packet at step S530.

Although not shown in FIG. 5, the MMTP packet processing method according to the embodiment may further include at least one of the steps of: 1) when the MMTP packet header is not compressed, the MPEG media transport receiving entity determining whether the MMTP packet is a reference MMTP packet, 2) if it is determined that the MMTP packet is the reference MMTP packet, storing reference information included in the MMTP packet header, and 3) if it is determined that the MMTP packet is not a reference MMTP packet, processing the MMTP packet as a normal MMTP packet. The at least one step may be performed by the MPEG media transport receiving entity.

Figure 6:
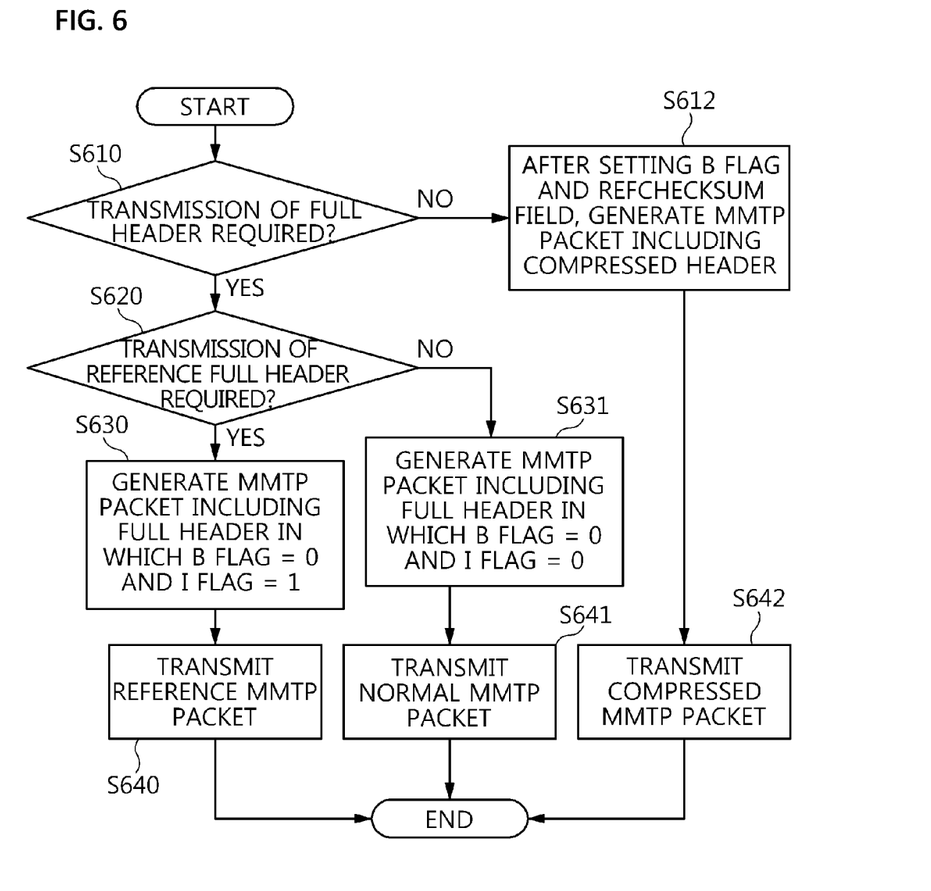
FIG. 6 is an operation flowchart showing a method for processing MMTP packets according to another embodiment of the present invention.

FIG. 6 is an operation flowchart showing a method for processing MMTP packets according to another embodiment of the present invention.

Referring to FIG. 6, in the MMTP packet processing method according to another embodiment of the present invention, the MPEG media transport sending entity may determine whether the transmission of a full-size header is required at step S610.

In the MMTP packet processing method according to the other embodiment, if it is determined at step S610 that the transmission of a full-size header is required, the MPEG media transport sending entity may determine whether the transmission of a reference full-size header is required at step S620.

In the MMTP packet processing method according to the other embodiment, if it is determined at step S610 that the transmission of a full-size header is not required, the MPEG media transport sending entity may set a B flag to 1, set a Refchecksum field or the like, and then generate a compressed MMTP packet at step S612.

Further, in the MMTP packet processing method according to the other embodiment, the MPEG media transport sending entity may transmit the generated compressed MMTP packet to the MPEG media transport receiving entity at step S642.

In the MMTP packet processing method according to the other embodiment, if it is determined at step S620 that the transmission of the reference full-size header is required, the MPEG media transport sending entity may generate a reference MMTP packet including a full-size header in which the B flag is set to 0 and the I flag is set to 1 at step S630.

Further, in the MMTP packet processing method according to the other embodiment, the MPEG media transport sending entity may transmit the generated reference MMTP packet to the MPEG media transport receiving entity at step S640.

Further, in the MMTP packet processing method according to the other embodiment, if it is determined at step S620 that the transmission of the reference full-size header is not required, the MPEG media transport sending entity may generate a normal MMTP packet including a full-size header in which the B flag is set to 0 and the I flag is set to 0 at step S631.

In the MMTP packet processing method according to the other embodiment, the MPEG media transport sending entity may transmit the generated normal MMTP packet to the MPEG media transport receiving entity at step S641.

Figure 7:
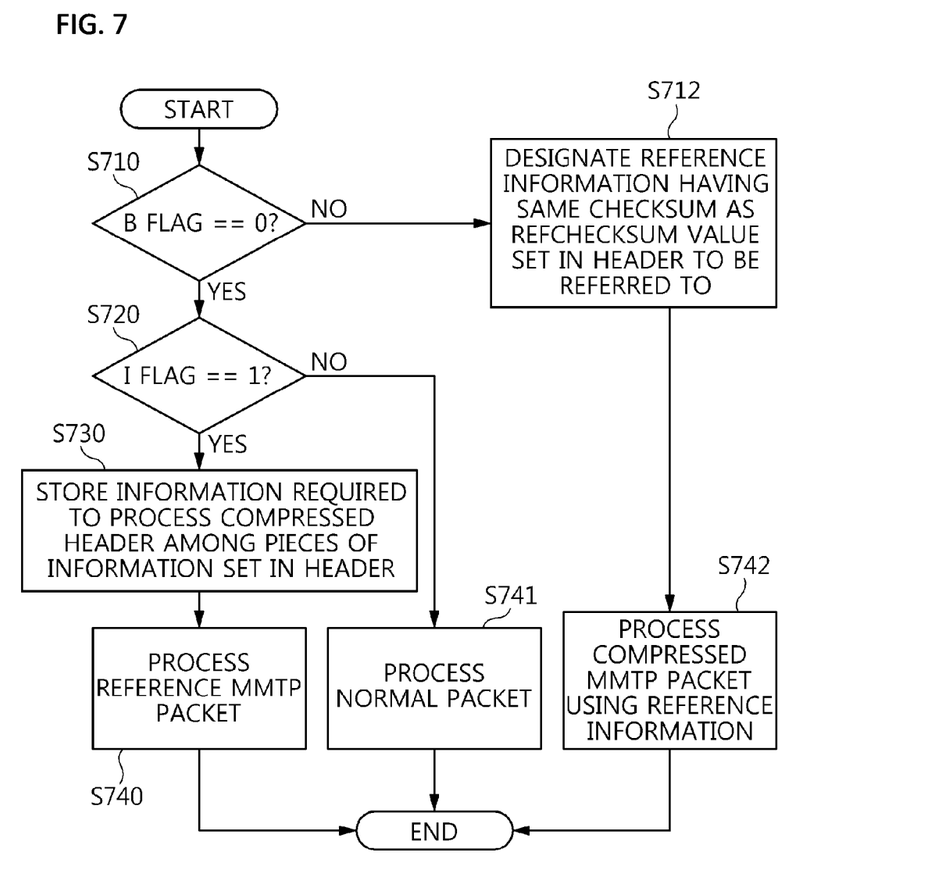
FIG. 7 is an operation flowchart showing a method for processing MMTP packets according to a further embodiment of the present invention.

FIG. 7 is an operation flowchart showing a method for processing MMTP packets according to a further embodiment of the present invention.

Referring to FIG. 7, in the MMTP packet processing method according to the further embodiment, the MPEG media transport receiving entity may determine whether the B flag of a received MMTP packet header is 0 at step S710.

In the MMTP packet processing method according to the further embodiment, if it is determined at step S710 that the B flag is 0, the MPEG media transport receiving entity may determine whether the I flag of the received MMTP packet header is 1 at step S720.

In the MMTP packet processing method according to the further embodiment, if it is determined at step S710 that the B flag is not 0, the MPEG media transport receiving entity may designate reference information having the same checksum as the Refchecksum value set in the header to be referred to at step S712.

Furthermore, in the MMTP packet processing method according to the further embodiment, the MPEG media transport receiving entity may process the compressed MMTP packet using reference information at step S742.

In the MMTP packet processing method according to the further embodiment, if it is determined at step S720 that the I flag is 1, the MPEG media transport receiving entity may store the information required to process the compressed header among pieces of information set in the header as reference information at step S730.

Further, in the MMTP packet processing method according to the further embodiment, the MPEG media transport receiving entity may process the reference MMTP packet at step S740.

In the MMTP packet processing method according to the further embodiment, if it is determined at step S720 that the I flag is not 1, the MPEG media transport receiving entity may process a normal MMTP packet at step S741.

Figure 8:
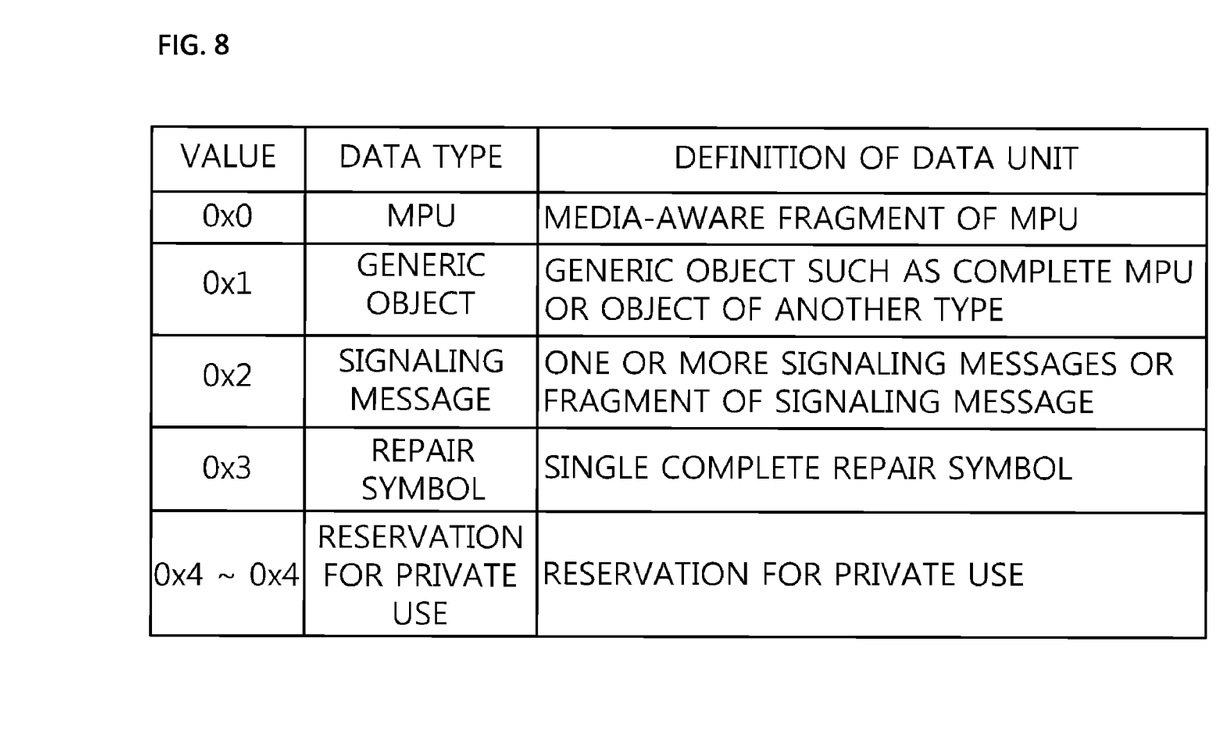
FIG. 8 is a diagram showing the payload data type field of an MMTP packet header according to an embodiment of the present invention.

FIG. 8 is a diagram showing the payload data type field of an MMTP packet header according to an embodiment of the present invention.

Referring to FIG. 8, the payload data type field of an MMTP packet header according to the embodiment has a 4-bit size, which is reduced by 2 bits compared to the 6-bit size of an existing MMTP packet, and may be set to one of 16 values, ranging from 0x0 to 0xF.

Of the values of the payload data type field, 0x0, 0x1, 0x2, and 0x3 may be used for an existing payload data type. That is, of the values of the payload data type field, 0x4 to 0xF may be reserved for a payload data type to be subsequently added.

In FIG. 8, various data types, such as an MPU generic object, a signaling message, a repair symbol, and reservation for private use, are illustrated as data types. "Media-aware fragment of MPU", "a generic object such as a complete MPU or an object of another type", "one or more signaling messages or a fragment of a signaling message", "a single complete repair symbol", and "reservation for private use" are described as the definition of the data types.

Figure 9:
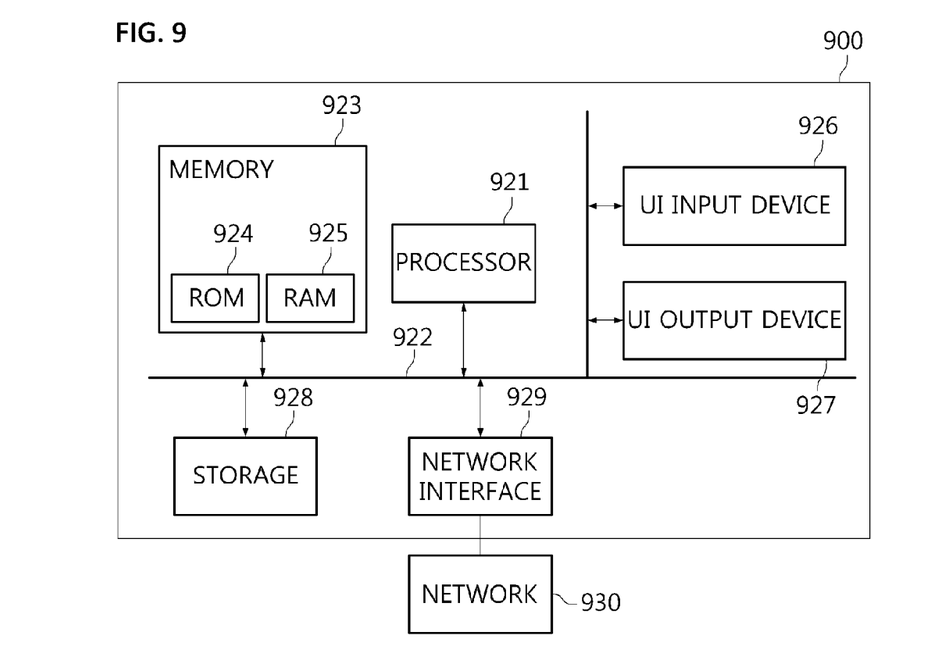
FIG. 9 is a configuration diagram showing a packet processing apparatus for compressing MMTP packets according to an embodiment of the present invention.

FIG. 9 is a configuration diagram showing a packet processing apparatus for compressing MMTP packets according to an embodiment of the present invention.

A packet processing apparatus 900 may be implemented in a computer system including a computer-readable storage medium. As shown in FIG. 9, the packet processing apparatus 900 includes a processor 921, memory 923, a user interface (UI) input device 926, a UI output device 927, and storage 928, which perform communication with each other through a bus 922. The packet processing apparatus 900 may further include a network interface 929 connected to a network 930. The processor 921 may be a semiconductor device for executing processing instructions stored in a Central Processing Unit (CPU), the memory 923, or the storage 928. Each of the memory 923 and the storage 928 may be any of various types of volatile or non-volatile storage media. For example, the memory may include Read Only Memory (ROM) 924 or Random Access memory (RAM) 925.

The memory 923 may store at least one program and the processor 921 may execute at least one program. Functions related to the communication of the data or information of the packet processing apparatus 900 may be performed via the network interface 929.

The at least one program may include, but is not limited to, a routine, a subroutine, a program, an object, a component, a data structure, etc., which perform a specific operation, which will be described later, or execute a specific abstract data type. The at least one program may be implemented using instructions or codes that are executed by the processor 921.

The packet processing apparatus 900 may be the above-described MPEG media transport sending entity. Further, the at least one program may perform steps S410, S420, and S430, which have been described above with reference to FIG. 4, and may perform steps S610, S612, S620, S630, S631, S640, S641, and S642, which have been described above with reference to FIG. 6.

Figure 10:
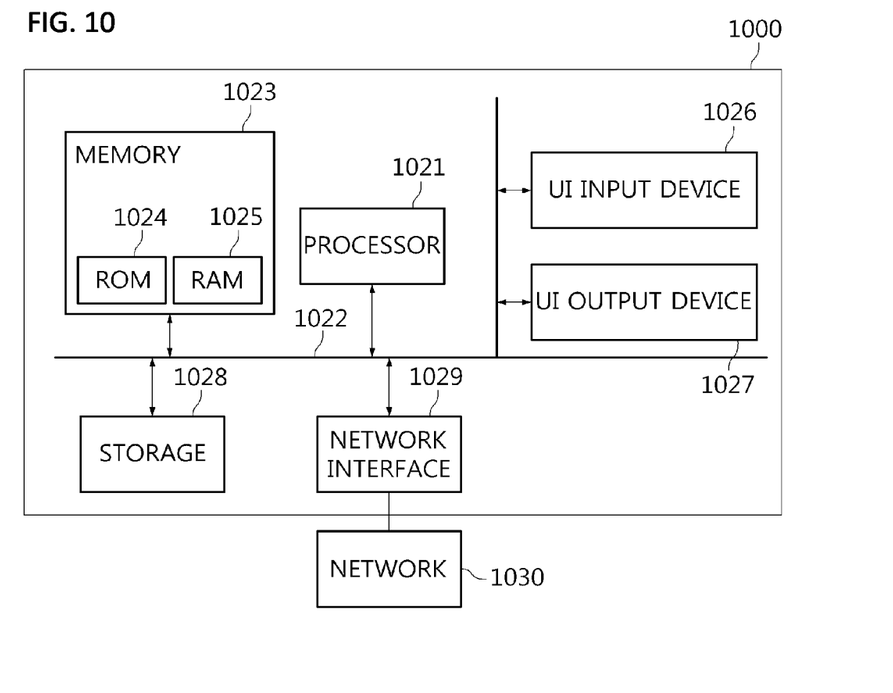
FIG. 10 is a configuration diagram showing a packet processing apparatus for processing MMTP packets according to an embodiment of the present invention.

FIG. 10 is a configuration diagram showing a packet processing apparatus for processing MMTP packets according to an embodiment of the present invention.

A packet processing apparatus 1000 may be implemented in a computer system including a computer-readable storage medium. As shown in FIG. 10, the packet processing apparatus 1000 includes a processor 1021, memory 1023, a UI input device 1026, a UI output device 1027, and storage 1028, which perform communication with each other through a bus 1022. The packet processing apparatus 1000 may further include a network interface 1029 connected to a network 1030. The processor 1021 may be a semiconductor device for executing processing instructions stored in a CPU, the memory 1023, or the storage 1028. Each of the memory 1023 and the storage 1028 may be any of various types of volatile or non-volatile storage media. For example, the memory may include ROM 1024 or RAM 1025.

The memory 1023 may store at least one program and the processor 1021 may execute at least one program. Functions related to the communication of the data or information of the packet processing apparatus 1000 may be performed via the network interface 1029.

The at least one program may include, but is not limited to, a routine, a subroutine, a program, an object, a component, a data structure, etc., which perform a specific operation, which will be described later, or execute a specific abstract data type. The at least one program may be implemented using instructions or codes that are executed by the processor 1021.

The packet processing apparatus may be the above-described MPEG media transport receiving entity. Further, the at least one program may perform steps S510, S520, and S530, which have been described above with reference to FIG. 5, and perform steps S710, S712, S720, S730, S740, S741, and S742, which have been described above with reference to FIG. 7.

The packet processing apparatus 900 of FIG. 9 and the packet processing apparatus 1000 of FIG. 10 may be physically identical devices. In other words, a single device may provide the function of the MPEG media transport sending entity and the function of the MPEG media transport receiving entity. Here, the at least one program executed by the packet processing apparatus 900 of FIG. 9 or the packet processing apparatus 1000 of FIG. 10 may perform all of steps S410, S420, and S430, which have been described above with reference to FIG. 4, steps S510, S520, and S530, which have been described above with reference to FIG. 5, steps S610, S612, S620, S630, S631, S640, S641, and S642, which have been described above with reference to FIG. 6, and steps S710, S712, S720, S730, S740, S741, and S742, which have been described above with reference to FIG. 7.

The method and apparatus for processing MMTP packets according to the present invention may be implemented in the form of program instructions that can be executed by various computer means and may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

The present invention is advantageous in that a reference value may be calculated from some field values of a reference MMTP packet header and the calculated reference value may be inserted into a compressed header, thus enabling MMTP packets to be correctly distinguished and referred to when there are two reference MMTP packets in which the lower 5 bits of packet sequence numbers are identical to each other, or even when the number of reference MMTP packets is a multiple of 256.

The present invention is advantageous in that inefficiency attributable to the repetitive transmission of a header may be prevented via the compression of the header and processing of the compressed header.

As described above, the method and apparatus for processing MMTP packets are not limited and applied to the configurations and operations of the above-described embodiments, but all or some of the embodiments may be selectively combined and configured so that the embodiments may be modified in various ways.

What is claimed is:

1. A method for processing Moving Picture Experts Group (MPEG) Media Transport Protocol (MMTP) packets, the method being performed by an MPEG media transport sending entity, the method comprising:
    calculating a reference value using partial field values of a reference MMTP packet header so as to refer to a reference MMTP packet;
    generating a reduced size header including the reference value as a field; and
    generating a compressed MMTP packet including the reduced size header,
    wherein calculating the reference value comprises calculating the reference value by applying a checksum algorithm to the partial field values of the reference MMTP packet header.

2. The method of claim 1, wherein the partial field values include a timestamp field value and a packet sequence number field value of the reference MMTP packet header.

3. The method of claim 2, wherein each of the timestamp field value and the packet sequence number field value is a 32-bit value.

4. The method of claim 1, wherein calculating the reference value comprises:
    if a number of bits of a resultant value generated by applying the checksum algorithm exceeds a preset number of bits, using a number of bits of the resultant value identical to the preset number of bits as the reference value.

5. The method of claim 4, wherein the preset number of bits is the number of bits of a field for which the reference value is to be set.

6. The method of claim 4, wherein calculating the reference value comprises:
    if the number of bits of the resultant value exceeds the preset number of bits, using a number of least significant bits of the resultant value identical to the preset number of bits as the reference value.

7. The method of claim 6, wherein the checksum algorithm is a Berkeley Software Distribution (BSD) checksum-8 algorithm.

8. The method of claim 1, wherein generating the reduced size header comprises:
    additionally including a predetermined difference as a field in the reduced size header, wherein the predetermined difference is a difference between a timestamp field value of the reference MMTP packet header and a possible value to be present in a current packet timestamp field if a full-size header is used.

9. The method of claim 1, wherein generating the reduced size header comprises additionally including part of possible bits of a packet sequence number field to be present in the header if a full-size header is used, as a field in the reduced size header.

10. The method of claim 1, wherein the reference MMTP packet header is allocated a compression flag field and an indicator flag field.

11. The method of claim 10, wherein the compression flag field is a field indicating which one of a full-size header and a compressed header has been used in the reference MMTP packet.

12. The method of claim 10, wherein the indicator flag field is a field indicating whether the full-size header of the reference MMTP packet is to be used as a reference of the compressed header.

13. The method of claim 10, wherein the reference MMTP packet header includes 4 bits corresponding to a reduced type field and 2 bits to which the compression flag field and the indicator flag field are respectively allocated.

14. A method for processing MMTP packets, the method being performed by an MPEG media transport receiving entity, the method comprising:
    determining, using a received MMTP packet header, whether a compressed header has been used in an MMTP packet;
    if it is determined that the compressed header has been used in the MMTP packet, verifying, using a reference value included in the MMTP packet header, whether a most recently received reference MMTP packet is to be used to decompress the MMTP packet header; and
    if it is verified that the reference MMTP packet is to be used to decompress the MMTP packet header, designating reference information of the reference MMTP packet to be referred to when the MMTP packet is processed.

15. The method of claim 14, wherein verifying whether the reference MMTP packet is to be used to decompress the MMTP packet header comprises:
    determining whether a value calculated by applying a checksum algorithm to a timestamp field value and a packet sequence number field value of the reference MMTP packet header is identical to the reference value included in the MMTP packet header; and
    if it is determined that the calculated value is identical to the reference value, verifying that the reference MMTP packet is to be used to decompress the MMTP packet header.

16. The method of claim 15, wherein the MMTP packet header is allocated a compression flag field and an indicator flag field.

17. A packet processing apparatus, comprising:
    memory for storing at least one program; and
    a processor for executing the at least one program,
    wherein the at least one program is configured to calculate a reference value using partial field values of a reference MMTP packet header to refer to a reference MMTP packet, generate a reduced size header including the reference value as a field, generate a compressed MMTP packet including the reduced size header, determine, using a received MMTP packet header, whether a compressed header has been used in an MMTP packet, if it is determined that the compressed header has been used in the MMTP packet, verify, using a reference value included in the MMTP packet header, whether a most recently received reference MMTP packet is to be used to decompress the MMTP packet header, and if it is verified that the reference MMTP packet is to be used to decompress the MMTP packet header, designate reference information of the reference MMTP packet to be referred to when the MMTP packet is processed.

18. The apparatus of claim 17, wherein the partial field values include a timestamp field value and a packet sequence number field value of the reference MMTP packet header.

* * * * *